3,087,899
PROCESS OF STABILIZING A RUBBER LATEX WITH A POLYALKYLENE ETHER/POLYALKYLENE THIOETHER

Heinz Esser, Cologne-Sulz, Gustav Sinn, Bergisch Neukirchen, and Hanswilli von Brachel, Cologne-Sulz, Germany, assignors to Farbenfabriken Bayer Aktiengesellschaft, Leverkusen, Germany, a corporation of Germany
No Drawing. Filed Aug. 4, 1959, Ser. No. 831,500
Claims priority, application Germany Aug. 12, 1958
9 Claims. (Cl. 260—2.5)

This invention relates to the stabilization of vulcanizable foams of rubber or plastic emulsions or dispersions.

It is known that foam rubber is mainly produced by beating up a vulcanizable latex mixture with aqueous soap solutions to form a foam, which is coagulated after adding certain sensitizing agents and then vulcanized. It is necessary in this case for the well-beaten foam to still be pourable for a sufficient period of time and not change too soon into a gelling or coagulation stage. This property is of particular importance when the manufacturer has to fill a relatively large number of small moulds with the foam, or if textiles are to be coated with foam. Furthermore, the well-beaten foam should have a good stability (rigidity), that is to say it should not collapse, even after standing for a relatively long time, but should remain unchanged in the well-beaten condition. Attempts have been made to achieve these properties by adding pine oil or so-called acid soaps to the latices, but the effects which are obtained thereby are still unsatisfactory.

It has been found that polyether polythioethers are very suitable as foam stabilizers for vulcanizable foams of rubbers or plastic emulsions or dispersions.

The polyether polythioethers designated thereafter also as polyether thioethers used according to the invention are polyethers in which some of the ether oxygen is replaced by sulfur. Suitable compounds are, for example, the compounds which can be characterized by the following formula $$R_1(XR_2)_m(XR_3)_n(XR_4)_o(XR_1)_{1+n+2o}$$

wherein $R_1$ represents hydrogen or a monovalent organic hydrocarbon radical such as an aliphatic or aromatic hydrocarbon radical which can be substituted, for example, by nitrile, carboxyl or acyl groups, $R_2$ represents a bifunctional hydrocarbon radical, $R_3$ represents a trifunctional hydrocarbon radical and $R_4$ represents a tetrafunctional hydrocarbon radical. The hydrocarbon radicals can be of aliphatic or aromatic nature. The aliphatic radicals contain preferably 2 to 4 carbon atoms but they can contain also a higher number of carbon atoms such as 20 carbon atoms. X represents in the above formula oxygen and sulfur, whereby the greater part of X represents oxygen and the smaller part sulfur. The indices $m$, $n$ and $o$ represent zero or a whole number whereby the sum of the indices must be so great that the molecule has a molecular weight of at least about 500 while also compounds having a far higher molecular weight of, for example, up to 100,000 can still be used. Particularly suitable are those compounds which are obtained by condensation of polyalkylene glycols with dihydroxy alkyl thioethers in the presence of dehydration catalysts, such for example as p-toluene sulfonic acid or phosphoric acid, at temperatures between 140 and 220° C. Examples of dihydroxyalkyl thioethers which may be used are thiodiglycol, β,β'-diphenyl thiodiglycol, the polythioether glycols formed from these compounds by spontaneous condensation and those polythioether glycols which are formed by reaction of alkylene halides with alkali metal sulfides and glycol chlorhydrin. Examples of polyalkylene glycols which can be employed are polyethylene glycols, polypropylene glycols, highly hydroxyalkylated aliphatic, cycloaliphatic or aromatic monohydric or polyhydric alcohols or mixtures of these compounds.

Stabilizers in accordance with this invention can also be produced by hydroxyethylation of polythioethers or polyether thioethers which still comprise free hydroxyl or mercaptan groups. Finally, stabilizers are also obtained if alkylene sulfides and ethylene oxide are simultaneously or successively co-polymerized.

Stabilizers in accordance with the invention can also be produced by hydroxyethylation of polythioethers or polyether thioethers which still comprise free hydroxyl or mercaptan groups. Finally, stabilizers are also obtained if alkylene sulfides and ethylene oxide are simultaneously or successively co-polymerized.

The stabilizers used according to the invention represent linear or branched compounds, the chains of which are interrupted at regular or irregular intervals by oxygen and sulfur atoms. In order to produce adequate water solubility in the cold, it is preferred to use those polyether thioethers which contain at least one oxygen atom to three carbon atoms. In these compounds, at least one oxygen atom is advantageously to be allotted to each sulfur atom. The molecular weight is higher than 500, advantageously between 1500 and 15,000.

The stabilizers can be added to the rubber or plastic emulsion or dispersions ("latices") in quantities of from 0.1 to 10% by weight, advantageously from 0.5 to 3% by weight, based on 100 parts by weight of the rubber or plastic dry substance. It is of no importance as regards the efficacy of the foam stabilizer whether the latex is first of all beaten with the usual constituents of the mixture to form a foam and the stabilizers used according to the invention are stirred into the beaten latex foam, or whether the foam stabilizer is added simultaneously with the other constituents of the mixture to the latex and this mixture is foamed. The latex foam obtained according to the conventional processes is very thinly liquid, whereby the filling of the moulds, especially those of complicated designs, is substantially facilitated. It retains its flow properties and pouring capacity for a relatively long time (for example 25 minutes) without showing gelling or coagulation effects or collapsing.

The following examples further illustrate the invention without limiting it thereto.

Example 1

The following mixture was prepared:

(a)

167 parts by weight of natural latex 60%=100 parts by weight of natural rubber dry substance,
1.0 part by weight of antioxidant (diphenylamine derivative)
7.0 parts by weight of sodium oleate, 10% in water
3.0 parts by weight of an alkyl sulfonate, 10% in water
2.5 parts by weight of zinc oxide
2.5 parts by weight of colloidal sulfur
0.8 part by weight of zinc diethyl dithiocarbamate
1.0 part by weight of 2-mercaptobenzimidazole
1.1 parts by weight of sodium silicofluoride
2.5 parts by weight of sodium methylene-bis-naphthalene sulfonate
30.0 parts by weight of water
3.0 parts by weight of polyether thioether (see below)

The foam produced with this mixture by beating in the usual way showed an excellent stability and did not collapse even after standing for more than 20 minutes. Since it is very thinly liquid, it could also be used for filling moulds of complicated design, for example those for toy figures without defects. The finally vulcanized latex foam articles showed a smooth skin and an excellent surface quality.

The polyether thioether, which was used, was obtained in the following manner:

415 grams of thiodiglycol and 13 grams of ortho phosphoric acid were heated to 150° C. until 41 cc. of water are distilled off, after approximately 30 to 60 minutes. To the mixture there were added 560 grams of a polyethylene glycol having a molecular weight of 1750, and the mixture is heated for 2 hours to 185° C. in vacuo at a pressure of 12 mm. Hg. In this way, there is obtained a mixture of polyether thioether glycols with an average molecular weight of 4700. If this mixture is heated for another 2 hours to 185° C. in vacuo, the molecular weight rises to an average value of 8500. Instead of the mixture indicated under (a), it is also possible to use the following mixtures, which produce foams having equally good properties when processed in the same way:

(b)

100.0 parts by weight of dry substance of a co-polymer of butadiene and styrene=200.0 parts by weight of 50% latex.
1.5 parts by weight of antioxidant (diphenylamine derivative)
3.0 parts by weight of polyether thioether
2.5 parts by weight of sulfur
2.5 parts by weight of zinc oxide
0.8 part by weight of zinc diethyl dithiocarbamate
1.0 part by weight of 2-mercaptobenzimidazole
1.0 part by weight of sodium silicofluoride
0.75 part by weight of sodium methylene-bis-naphthalene sulfonate
30.0 parts by weight of water (c)

167.0 parts by weight of 60% latex=100.0 parts by weight of poly-2-chlorobutadiene dry substance
7.5 parts by weight of zinc oxide
2.0 parts by weight of sulfur
0.2 part by weight of diphenyl thiourea
2.0 parts by weight of sodium ethylcyclohexyl-dithiocarbamate
0.4 part by weight of an alkyl sulfonate
0.4 part by weight of sodium oleate
2.0 parts by weight of sodium silicofluoride
3.0 parts by weight of polyether thioether

*Example 2*

(a) The following mixture was prepared:

167.0 parts by weight of 60% natural latex=100 parts by weight of natural rubber dry substance
4.2 parts by weight of sodium oleate, 10% in water
0.6 part by weight of antioxidant (diphenylamine derivative)
3.0 parts by weight of colloidal sulfur
1.0 part by weight of zinc oxide
3.0 parts by weight of water
0.6 part by weight of mercaptobenzimidazole
12.0 parts by weight of ammonium chloride as 2.6% aqueous solution
2.5 parts by weight of sodium methylene-bis-naphthalene sulfonate
4.2 parts of a 15% aqueous solution of the polyether thioether described below The foam produced with this mixture in the usual way by beating showed an excellent rigidity and did not collapse even after standing for 20 minutes. It was coated in the usual way onto a cotton fabric and had an excellent foam structure after vulcanization. A mixture prepared by way of comparison without the stabilizer only remains suitable for casting for 4 minutes and has irregular pores.

(b) For the manufacture of moulded articles the following mixture was prepared:

167.0 parts by weight of 60% natural latex=100.0 parts by weight of natural rubber dry substance
7.0 parts by weight of sodium oleate, 10% in water
3.0 parts by weight of an alkyl sulfonate, 10% in water
1.0 part by weight of antioxidant (diphenylamine derivative)
2.5 parts by weight of colloidal sulfur
2.5 parts by weight of zinc oxide
12.0 parts by weight of water
1.0 part by weight of mercaptobenzimidazole
2.5 parts by weight of sodium silicofluoride
2.5 parts by weight of sodium salt of methylene-bis-naphthalene sulfonate This mixture was beaten in the usual way to form a foam. It coagulated after 20 minutes and had a very good structure when it was cast in a mould heated to 40° C. A mixture prepared without stabilizer coagulated after 4 minutes and the mould had to be cooled to 20° C. before pouring in the foam The stabilizer mentioned above was prepared in the following manner:

1250 grams of thiodiglycol, 875 grams of polyethylene glycol (molecular weight 1130) and 30 grams of phosphoric acid were heated while stirring vigorously in a distillation apparatus, initially for 6 hours at atmospheric pressure and thereafter for 4 hours in a vacuum of 12 mm. Hg to 185° C. The reaction mixture then has an OH number of 26, corresponding to a molecular weight of 4300.

*Example 3*

A latex mixture, such as that described in Example 2(a) has the following polythioethers added thereto in the same concentration instead of the polyether thioether stabilizers described in the said example:

(a) A condensate of 1470 grams of thiodiglycol, 2130 grams of octaethylene glycol, 25 grams of orthophosphoric acid and 25 grams of maleic anhydride having a molecular weight of 6400 and prepared by heating for 20 hours under atmospheric pressure and 10 hours under a vacuum of 15 mm. Hg to 180° C.;

(b) A condensate of 450 grams of thiodiglycol, 600 grams of a mixed polymerisate of ethylene oxide and propylene oxide (ratio by weight 4:1, molecular weight 1500) and 15 grams of ortho-phosphoric acid, having a molecular weight of 5000 and prepared by heating for 6 hours under normal pressure and 4 hours under a vacuum of 15 mm. Hg to 185° C.;

(c) A condensate of 450 grams of thiodiglycol, 500 grams of hydroxyethylated hexane-1,4-diol (molecular weight 1800) and 15 grams of ortho-phosphoric acid, having a molecular weight of 18,600 and prepared by heating for 6 hours under atmospheric pressure and 12 hours under a vacuum of 15 mm. Hg to 185° C.;

(d) 450 grams of β,β'-dimethyl thiodiglycol, 600 grams of hydroxy-ethylated butane-1,3-diol (molecular weight 1600) and 16 grams of ortho-phosphoric acid, having a molecular weight of 4800 and prepared by heating for 6 hours under normal pressure and 3 hours in a vacuum of 15 mm. Hg to 185° C.;

(e) A condensate of 450 grams of thiodiglycol, 560 grams of polyethylene oxide (molecular weight 1700) and 13 grams of orthophosphoric acid, having a molecular weight of 4300 and prepared by heating for 15 hours under normal pressure to 185° C.;

(f) A condensate as described under 3(e), in which however 30% of the sulfur were dioxidized to sulfoxide by heating to 50° C. with the calculated quantity of hydrogen peroxide;

(g) A condensate prepared from 450 grams of thiodiglycol, 700 grams of polyethylene oxide (molecular weight 1800) and 14 grams of orthophosphoric acid, having a molecular weight of 55,000 and prepared by heating to 185° C. for 4 hours under normal pressure and 24 hours under a vacuum of 12 mm. Hg;

(h) A condensate prepared from 450 grams of thiodiglycol, 700 grams of polyethylene oxide (molecular weight 1400) and 14 grams of orthophosphoric acid, having a molecular weight of 9200 and prepared by heating for 4 hours under normal pressure and 15 hours under vacuum of 15 mm. Hg, the OH groups thereof being esterified with acetic acid anhydride;

(i) A condensate such as described under 3(a), but of which the terminal groups have been esterified with stearic acid;

(j) A condensate such as described under 3(a), but of which the terminal groups have been esterified with phthalic acid anhydride;

(k) A condensate such as that described under 3(a), but the terminal groups of which have been esterified with phenyl isocyanate;

(l) A condensate such as described under 3(a), but the terminal groups of which have been esterified with stearyl isocyanate;

(m) A condensate such as described under 3(a), but the terminal groups of which have been esterified with 1-naphthyl-isocyanate;

(n) A condensate such as described under 3(a), but the terminal groups of which have been etherified with acrylonitrile;

(o) A condensate such as described under 3(a), but the terminal groups of which have been etherified with butyl vinyl sulfone;

(p) A condensate of 500 grams of hydroxyethylated oleyl alcohol (molecular weight 500), 1000 grams of polyethylene oxide (molecular weight 1800), 500 grams of thiodiglycol and 25 grams of orthophosphoric acid, prepared by heating for 4 hours under normal pressure and 30 hours in vacuo to 180° C.;

(q) A condensate of 300 grams of γ-dihydroxypropyl sulfide, 600 grams of polyethylene oxide (molecular weight 1100) and 3 grams of p-toluene sulfonic acid, having a molecular weight of 4000 and prepared by heating for 8 hours in vacuo at 165° C.;

(r) A condensate of 300 grams of 3,10-dithiododecan-1,12-diol, 800 grams of polyethylene oxide of the molecular weight of 1600 and 3 grams of sulfanilic acid, having a molecular weight of 5500 and prepared by heating for 8 hours to 175° C.;

(s) A condensate of 1000 grams of hydroxyethylated resorcinol (molecular weight 1100), 250 grams of thiodiglycol and 20 grams of phosphoric acid, having a molecular weight of 5000 and prepared by heating for 5 hours under normal pressure and for 25 hours in vacuo to 180° C.;

(t) A condensate of 1000 grams of hydroxyethylated trimethylol propane (molecular weight 1000), 500 grams of thiodiglycol and 19 grams of orthophosphoric acid, having a molecular weight of 3800 and prepared by heating for 10 hours to 185° C.;

(u) A condensate of 1200 grams of hydroxyethylated pentaerythritol (molecular weight 1200), 600 grams of thiodiglycol and 25 grams of orthophosphoric acid, having a molecular weight of 3900 and prepared by heating for 8 hours to 185° C.;

(v) A condensate of 700 grams of hydroxyethylated aniline (molecular weight 900), 500 grams of thiodiglycol and 22 grams of orthophosphoric acid, having a molecular weight of 400 and prepared by heating for 5 hours under normal pressure and for 6 hours in a vacuum to 185° C.;

All the mixtures form foams which can be poured for 20 to 25 minutes and the vulcanizates of which have very uniform pores.

We claim:

1. In a process of stabilizing a rubber latex foam, the improvement comprising incorporating into said foam as a stabilizing agent a polyalkylene ether/polyalkylene thioether having a molecular weight of about 500–100,000.

2. In a process for stabilizing a rubber latex foam, the improvement comprising incorporating into said foam as a stabilizing agent a polyether-polythioether of the formula:

$$R_1(XR_2)_m(XR_3)_n(XR_4)_o(XR_1)_{1+n+2o}$$

wherein $R_1$ represents a member selected from the group consisting of hydrogen, monovalent organic hydrocarbon radicals, and monovalent hydrocarbon radicals substituted by a member selected from the group consisting of nitrile, carboxyl, and acyl groups, $R_2$ represents a bifunctional hydrocarbon radical, $R_3$ represents a trifunctional hydrocarbon radical, $R_4$ represents a tetrafunctional hydrocarbon radical, the indices $m$, $n$ and $o$ represent a member selected from the group consisting of zero and a whole number, the sum of said indices being so great that the molecule has a molecular weight of at least 500–100,000 and wherein X is selected from the group consisting of oxygen and sulfur, a majority of the X substituents being oxygen but at least part of the X substituents being sulfur.

3. In a process for stabilizing a rubber latex foam, the improvement which comprises incorporating into said foam as a stabilizing agent a polymer of the formula:

$$HO-A-(X\text{-alkylene})_n-OH$$

wherein A is an alkylene group of 2–4 carbon atoms, a majority of the —(X-alkylene) units are (O-alkylene) radicals of 2–4 carbon atoms, the remainder of the —(X-alkylene) units are —(S—$C_2H_4$) radicals, and wherein $n$ is so great that the polymer has a molecular weight of about 500–100,000.

4. In a process for stabilizing a rubber latex foam, the improvement which comprises incorporating into said foam as a stabilizing agent a polymer of the formula:

$$HO-C_2H_4-(X-C_2H_4)_n-OH$$

wherein a majority of the —(X—$C_2H_4$) units are $$-(O-C_2H_4)$$

radicals and the remainder are —(S—$C_2H_4$) radicals, and wherein $n$ is so great that the polymer has a molecular weight of about 500–100,000.

5. In a process for stabilizing a rubber latex foam, the improvement which comprises incorporating into said foam as a stabilizing agent a polymer of the formula:

$$HO-A-(X\text{-alkylene})_n-OH$$

wherein A is an alkylene radical selected from the group consisting of ethylene and hexylene, a majority of the —(X-alkylene) units are —(O—$C_2H_4$) radicals, the remainder of the —(X-alkylene) units being —(S—$C_2H_4$) radicals, and wherein $n$ is so great that the polymer has a molecular weight of about 500–100,000.

6. In a process wherein a vulcanizable rubber latex is beaten into a foam which is subsequently poured into a mold, coagulated, and vulcanized, the improvement comprising preventing the foam from coagulating before it is poured into the mold by incorporating into the latex as a stabilizing agent a polyether-polythioether of the formula:

$$R_1(XR_2)_m(XR_3)_n(XR_4)_o(XR_1)_{1+n+2o}$$

wherein $R_1$ represents a member selected from the group consisting of hydrogen, monovalent organic hydrocarbon radicals, and monovalent hydrocarbon radicals substituted by a member selected from the group consisting of nitrile, carboxyl, and acyl groups, $R_2$ represents a bifunctional hydrocarbon radical, $R_3$ represents a trifunctional hydrocarbon radical, $R_4$ represents a tetrafunctional hydrocarbon radical, the indices $m$, $n$ and $o$ represent a member selected from the group consisting of zero and a whole number, the sum of said indices being so great that the molecule has a molecular weight of at least 500–100,000 and wherein X is selected from the group consisting of oxygen and sulfur, a majority of the X substituents being oxygen but at least part of the X substituents being sulfur.

7. In a process wherein a rubber latex is beaten into a foam which is then coated onto a textile substrate and then coagulated and vulcanized, the improvement comprising preventing premature coagulation of the latex foam, before it is applied to the textile, by incorporating into the latex as a stabilizing agent a polyether-polythio-ether of the formula:

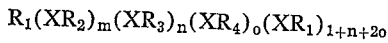

wherein $R_1$ represents a member selected from the group consisting of hydrogen, monovalent organic hydrocarbon radicals, and monovalent hydrocarbon radicals substituted by a member selected from the group consisting of nitrile, carboxyl, and acyl groups, $R_2$ represents a bifunctional hydrocarbon radical, $R_3$ represents a trifunctional hydrocarbon radical, $R_4$ represents a tetrafunctional hydrocarbon radical, the indices $m$, $n$ and $o$ represent a member selected from the group consisting of zero and a whole number, the sum of said indices being so great that the molecule has a molecular weight of at least 500–100,000 and wherein X is selected from the group consisting of oxygen and sulfur, a majority of the X substituents being oxygen but at least part of the X substituents being sulfur.

8. Process of claim 6 wherein the stabilizer is added to the latex foam.

9. Process of claim 7 wherein the stabilizer is added to the latex foam.

References Cited in the file of this patent

UNITED STATES PATENTS

| | | |
|---|---|---|
| 2,809,173 | Derenuk | Oct. 8, 1957 |
| 2,900,368 | Stilmar | Aug. 18, 1959 |
| 2,905,720 | De Benneville et al. | Sept. 22, 1959 |
| 2,905,721 | De Benneville et al. | Sept. 22, 1959 |

FOREIGN PATENTS

| | | |
|---|---|---|
| 643,456 | Great Britain | Sept. 20, 1950 |
| 749,339 | Great Britain | May 23, 1956 |

OTHER REFERENCES

Schwartz et al.: "Surface Active Agents and Detergents," volume II, 1958, page 332, Interscience Publishers Inc.